US011714877B1

(12) United States Patent
Shoshan et al.

(10) Patent No.: US 11,714,877 B1
(45) Date of Patent: Aug. 1, 2023

(54) SYSTEM FOR TRAINING OF RECOGNITION SYSTEM USING AD HOC TRAINING DATA

(71) Applicant: AMAZON TECHNOLOGIES, INC., Seattle, WA (US)

(72) Inventors: Alon Shoshan, Haifa (IL); Miriam Farber, Haifa (IL); Nadav Israel Bhonker, Haifa (IL); Igor Kviatkovsky, Haifa (IL); Manoj Aggarwal, Seattle, WA (US); Gerard Guy Medioni, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/038,463

(22) Filed: Sep. 30, 2020

(51) Int. Cl.
  *G06K 9/62* (2022.01)
  *G06N 3/08* (2006.01)
  *G06N 3/04* (2006.01)
  *G06V 10/145* (2022.01)
  *G06V 40/13* (2022.01)
  *G06N 3/088* (2023.01)
  *G06V 40/12* (2022.01)
  (Continued)

(52) U.S. Cl.
  CPC ......... *G06F 18/214* (2023.01); *G06N 3/0454* (2013.01); *G06N 3/088* (2013.01); *G06V 10/145* (2022.01); *G06V 40/1318* (2022.01); *G06V 40/1347* (2022.01)

(58) Field of Classification Search
  CPC ............. G06K 9/6256; G06V 40/1318; G06V 10/145; G06V 40/1347; G06N 3/0454; G06N 3/088
  See application file for complete search history.

(56) References Cited

U.S. PATENT DOCUMENTS

| 10,943,154 | B2 * | 3/2021 | Taha | G06V 10/82 |
|---|---|---|---|---|
| 11,030,782 | B2 * | 6/2021 | Ayush | G06N 3/0454 |
| 11,200,429 | B1 * | 12/2021 | Evans | G06V 20/56 |

(Continued)

OTHER PUBLICATIONS

Marriott, Richard T., et al. "An assessment of GANs for identity-related applications." 2020 IEEE International Joint Conference on Biometrics (IJCB). IEEE, 2020. (Year: 2020).*

(Continued)

*Primary Examiner* — Utpal D Shah
(74) *Attorney, Agent, or Firm* — Lindauer Law, PLLC

(57) ABSTRACT

A machine learning system to determine an identity of a user is trained using triplets of ad hoc synthetic data and actual data. The data may comprise multimodal images of a hand. Each triplet comprises an anchor, a positive, and a negative image. Synthetic triplets for different synthesized identities are generated on an ad hoc basis and provided as input during training of the machine learning system. The machine learning system uses a pairwise label-based loss function, such as a triplet loss function during training. Synthetic triplets may be generated to provide more challenging training data, to provide training data for categories that are underrepresented in the actual data, and so forth. The system uses substantially less memory during training, and the synthetic triplets need not be retained further reducing memory use. Ongoing training is supported as new actual triplets become available, and may be supplemented by additional synthetic triplets.

20 Claims, 6 Drawing Sheets

(51) Int. Cl.
  *G06N 3/045* (2023.01)
  *G06F 18/214* (2023.01)

(56) References Cited

U.S. PATENT DOCUMENTS

| | | | | |
|---|---|---|---|---|
| 11,250,569 | B2* | 2/2022 | Carmi | A61B 6/12 |
| 2018/0330205 | A1* | 11/2018 | Wu | G06N 3/02 |
| 2020/0142994 | A1* | 5/2020 | Jin | G06N 3/0445 |
| 2020/0309541 | A1* | 10/2020 | Lavy | G01C 21/1656 |
| 2020/0411167 | A1* | 12/2020 | Kearney | G06N 3/0454 |
| 2021/0117773 | A1* | 4/2021 | Sollami | G06K 9/6218 |
| 2021/0201003 | A1* | 7/2021 | Banerjee | G06V 40/169 |
| 2021/0201075 | A1* | 7/2021 | Pahde | G06N 3/0454 |
| 2021/0227291 | A1* | 7/2021 | Wolowiec | G06N 3/04 |
| 2021/0256422 | A1* | 8/2021 | Unterthiner | G06K 9/6272 |
| 2021/0343051 | A1* | 11/2021 | Hasan | G06T 11/001 |
| 2021/0406727 | A1* | 12/2021 | Wang | G06N 5/04 |
| 2022/0012530 | A1* | 1/2022 | Singh | G06K 9/6262 |
| 2022/0083855 | A1* | 3/2022 | Choi | G06N 7/005 |
| 2022/0101146 | A1* | 3/2022 | el Kaliouby | G06N 3/088 |

OTHER PUBLICATIONS

Donahue, Chris, et al. "Semantically decomposing the latent spaces of generative adversarial networks." arXiv preprint arXiv: 1705.07904 (2017). (Year: 2017).*

Schroff, Florian, Dmitry Kalenichenko, and James Philbin. "Facenet: A unified embedding for face recognition and clustering." Proceedings of the IEEE conference on computer vision and pattern recognition. 2015. (Year: 2015).*

"Framing: Key ML Terminology—Machine Learning Crash Course", 5 pages. Retrieved from the Internet: URL: https://developersgoogle.com/machine-learning/crash-course/framing/ml-terminology.

Duan, et al., "Deep Adversarial Metric Learning", Department of Automation, Tsinghua University, China. Computer Vision Foundation (open access), pp. 2780-2789. Retrieved from the Internet: URL: https://openaccess.thecvf.com/content_cvpr_2018/papers/Duan_Deep_Adversarial_Metric_CVPR_2018_paper.pdf.

Gao, et al., "Margin Loss: Making Faces More Separable", IEEE Signal Processing Letters, vol. 25, No. 2, Feb. 2018, pp. 308-312.

Hermans, et al., "In Defense of the Triplet Loss for Person Re-Identification", Visual Computing Institute, RWTH Aachen University, 17 pages. Retrieved from the Internet: URL: arxiv.org/pdf/1703.07737.pdf.

Kar, et al., "On the Generalization Ability of Online Learning Algorithms for Pairwise Loss Functions", Proceedings of the 30th International Conference on Machine Learning, Atlanta, Georgia, 2013. JMLR: W&CP vol. 28. Copyright 2013. 25 pages. Retrieved from the Internet: URL: https://www.microsoft.com/en-us/research/wp-content/uploads/2013/01/On-the-Generalization-Ability-of-Online-Learning-Algorithms-for-Pairwise-Loss-Functions_Kar_Sriperumubudur_Jain_Karnick pdf.

Liu, et al., "Large-Margin Softmax Loss for Convolutional Neural Networks", Proceedings of the 33rd International Conference on Machine Learning, New York, NY, 2016. JMLR: W&CP vol. 48, 10 pages. Copyright 2016. Retrieved from the Internet: URL: https://arxiv.org/pdf/1612.02295.pdf.

* cited by examiner

SYSTEM FOR TRAINING OF RECOGNITION SYSTEM USING AD HOC TRAINING DATA

BACKGROUND

A large set of training data may be needed to train a machine learning system.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
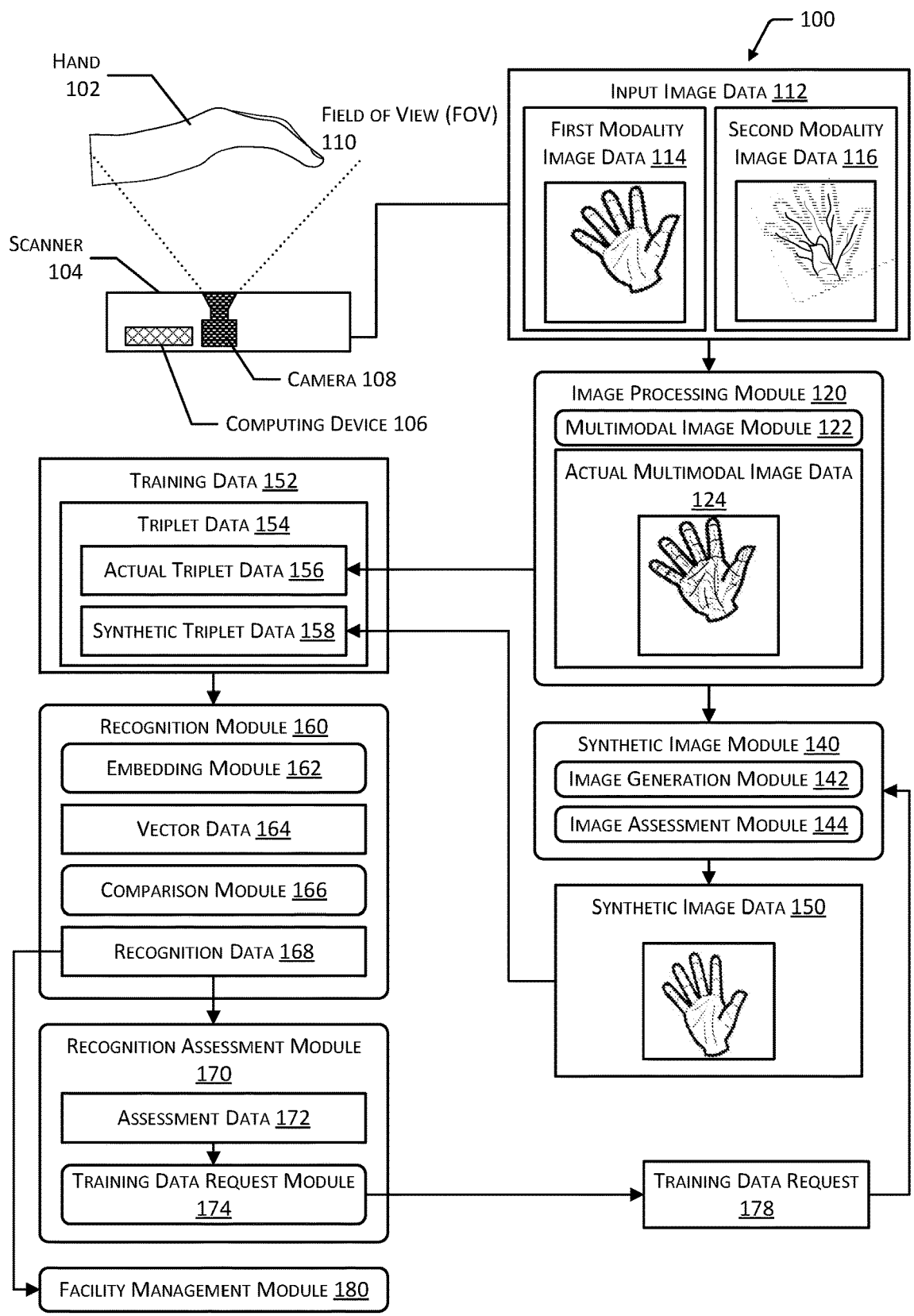
FIG. 1 illustrates a system to train a machine learning system to recognize images, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, entry to a material handling facility (facility), office, transportation facility, or other location may be controlled based on user identity. As the user enters the facility, they may be identified using the devices and techniques described herein.

Traditional systems for identifying users suffer from several significant drawbacks including susceptibility to fraud, slow speed, inaccuracy, and operational limitations. For example, a traditional system to identify a user by presenting a token, such as an identification card, may be used by someone other than an authorized user. As a result, systems that involve only the use of "something you have" are vulnerable to misuse. Biometric identification systems deal with this by using a characteristic of the particular individual that is difficult or impossible to copy or be transferred.

Biometric identification systems that use machine learning systems, such as artificial neural networks, may be trained using training data. For example, a system that is trained to recognize features in an image of a human palm may be trained using images of actual human palms. However, training of machine learning systems may require large sets of unique data. In many situations, the greater the set of training data, the greater the accuracy of the results produced by the machine learning system. Continuing the example, a set of training data used to train a machine learning system may include millions of images of different human palms. It may be infeasible to acquire such training data. For example, the cost to acquire images of millions of different hands on different people may be prohibitive. Previously acquired sets of images acquired for different purposes may be unusable due to inadequate data. For example, red-green-blue (RGB) images of the surfaces of human palms may be inadequate to train a system that attempts to recognize users based on multimodal data that includes surface features and subsurface features such as veins or other anatomical features.

The development of training data is further complicated if the presentation of the object being depicted may change due to changes in pose, articulation, illumination, size, and so forth. For example, a user holding their hand over a scanning device that includes an upward facing camera to acquire multimodal images may have their palm tilted at various angles, finger joints may be bent, distance from the camera may change, and so forth. Due to the additional degrees of freedom that are provided to the unconstrained hand, the image produced by this type of system may exhibit significant variability. As a result of this real-world variability, training data may need to replicate different appearances of at least part of a hand in different poses, articulation, under different lighting conditions, and so forth.

Traditional training of machine learning systems for recognition involve training classification models, with each identity having a separate class. During training, each class that is maintained results in a substantial use of working memory, such as random access memory (RAM). As a result, training of these traditional systems does not scale well. For example, a traditional system may accommodate training using 10,000 identities, but would not scale to billions of identities due to limitations of working memory. Traditional training also does not facilitate ongoing training. As new actual data is acquired, the traditional machine learning system requires extensive retraining that again requires substantial working memory, as well as processor resources. Traditional training also involves persisting training data within a training session, and may also include persisting data from one training session to another. This results in a substantial demand for persistent memory, such as solid-state disk (SSD), hard disks, and so forth. Traditional systems also consume substantial bandwidth on a network between device(s) executing the training and storage device(s) that provide persistent memory. For example, transferring terabytes of persisted training data from a storage server to a processing server consumes substantial bandwidth on a local area network.

Described in this disclosure are techniques for training a machine learning system using actual image data as well as ad hoc synthetic image data. The synthetic image data is ad hoc in that it is generated "on the fly" for training the machine learning system. A relatively small sample of actual hands are scanned to provide actual images. For example, a first actual image of an actual hand may depict surface features while a second actual image of the actual hand depicts sub-surface features such as veins. The actual images are then used as training data for training a first machine learning system to generate synthetic image data. For example, the first machine learning system may use a generative adversarial network (GAN) that is trained using a plurality of actual images to generate synthetic images. These synthetic images may represent different synthetic identities, different synthetic appearances and so forth.

Training data is used to train a second machine learning system to recognize the features and provide as output recognition data that is indicative of whether an input image is deemed to match a previously stored identity. The second machine learning system may utilize a pairwise label-based loss function, such as a triplet loss function, during training. The training data comprises a plurality of triplet data. Each triplet includes an anchor sample, a positive sample, and a negative sample. For example, the anchor sample is associated with a first identity, the positive sample is also associated with the first identity but may differ in some features, while the negative sample is not associated with the first identity. Continuing the example, the anchor sample may comprise a first image of the hand of user "Bob" during an enrollment phase with a first appearance such as pose and lighting. The positive sample may comprise a second image of the user "Bob" during the enrollment phase, but this time with a second appearance such as a different pose, different lighting, and so forth. The negative sample may comprise a third image of the user "Leonard" with an appearance that may be the same or different from the anchor or positive samples.

The training data used to train the second machine learning system may include some actual triplet data that is based on actual users and some synthetic triplet data that is generated by the first machine learning system. Operation of the trained second machine learning system may be assessed to determine if performance is acceptable, and if not, to guide further training. A training session for training the second machine learning system may involve a plurality of iterations of generating first training data, training the second machine learning system at a first time, assessing the operation of the second machine learning system, generating second training data, training the second machine learning system at a second time using the second training data, and so on. For example, the assessment data may indicate that after training using the first training data, a particular category of users are associated with identification rates below a threshold value. Based on this, the first machine learning system may generate, on an ad hoc basis, the second training data that comprises an increased number of synthetic triplets that are associated with the particular category. The increased frequency of synthetic triplets associated with the particular category in the second training data provides increased opportunity for the training of the second machine learning system at the second time to take into consideration data associated with the particular category.

The use of the second machine learning system that implements a margin-loss function removes the need to maintain within memory separate classes for each identity being used during training. As a result, the memory requirements for this system are substantially reduced compared to other techniques. This allows the second machine learning system to be trained using large numbers of identities, both actual and synthetic. Actual triplets used for training may be retrieved from persistent storage while synthetic triplets are generated as needed for training. This results in substantial reductions in the quantity of persistent storage needed and also reduces the quantity of data to be transferred between persistent storage and working storage for training. The reductions in memory use allow a significant increase in the number of identities, as embodied by triplets, that may be used to train the second machine learning system. This increase in the number of identities, both actual and synthetic, used to train results in significant improvements in overall accuracy of the second machine learning during operation.

Illustrative System

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112 obtained using two or more modalities. The scanner 104 may include other components which are not shown. For example, the scanner 104 may include lights that illuminate the object in the FOV 110.

In the implementation depicted, the hand 102 is held above the camera 108, with the FOV 110 extending upward. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. In other implementations, other configurations may be used. For example, the camera 108 may have the FOV 110 extending downwards, and the user may place their hand 102 in the FOV 110 under the scanner 104.

The scanner 104 may be configured to acquire multimodal images of the hand 102. A first modality may acquire images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include creases, wrinkles, scars, dermal papillae ridges, and so forth in at least the epidermis of the hand 102.

Second modality features comprise those features that are below the epidermis. The second modality may acquire images in which the hand 102 is illuminated with light having a second polarization and obtained by the camera 108 with the polarizer passing light to the camera 108 with the first polarization. For example, the second modality features may include anatomical structures such as veins, bones, soft tissue, or other sub-surface features. Some features may be visible in both first modality and second modality images. For example, a crease in the palm may include first modality features on the surface as well as deeper second modality features within the palm.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same image may be acquired in rapid succession with respect to one another. For example, the camera 108 may operate at 60 frames per second and acquire the first modality image data 114 in a first frame and the second modality image data 116 in a second frame.

The user may place their hand 102 within the FOV 110 in various poses, distances, translations, and so forth. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the scanner 104 to several meters in which the hand 102 is too far away for a useful image to be acquired. The translation indicates the translation or apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the scanner 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary considerably due to changes in articulation, pose, distance, translation, and so forth.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the user 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

An image processing module 120 may receive the input image data 112 and perform additional processing. The image processing module 120 may provide one or more functions. For example, the image processing module 120 may apply one or more filters to one or more of the first modality image data 114 or the second modality image data 116. In some implementations, a multimodal image module 122 may be used to generate an actual multimodal image data (AMID) 124. The multimodal image module 122 may generate the AMID 124 by combining data from two or more modality images into a single image. For example, the first modality image data 114 and the second modality image data 116 may each comprise grayscale images. The multimodal image module 122 may combine the two images to generate the AMID 124. For example, first grayscale data from the first modality image data 114 may be stored as a first channel of the AMID 124 while second grayscale data from the second modality image data 116 may be stored as a second channel of the AMID 124. In some implementations the multimodal image module 122 may provide other functions. For example, the multimodal image module 122 may align the first modality image data 114 and the second modality image data 116. This alignment may include one or more of rotation or translation of a portion of the images. The techniques described in this disclosure may use individual images acquired with different modalities, such as the input image data 112, or may use the actual multimodal image data 124.

Traditionally, training data used to train a machine learning system to recognize features is unique and extensive. For example, to recognize a particular hand as depicted in input image data 112, the machine learning system would be trained using a set of images of hundreds of thousands of unique hands. A hand may be considered unique if the features of that hand differ sufficiently from other previously known hands. For example, the features of a hand may be expressed as vector values. The vector values for a particular hand describe a particular location in a vector space. If a first location in vector space for a first hand is greater than a minimum distance away from a second location in the vector space of a second hand, the two may be deemed to be unique with respect to one another. If the first location in the vector space for the first hand is less than a specified distance away from the second location in vector space, the second hand and the first hand may be deemed to be the same.

Acquiring input image data 112 for hundreds of thousands or millions of samples, such as hands, may be infeasible. For example, such acquisition may be too costly, take too much time, and so forth. Additionally, acquisition may include incomplete samples of users that are associated with different categories. For example, a set of input image data 112 may predominately comprise samples of users that are between the ages of 20 and 30 years old, while few samples of users between the ages of 70 and 90 years may be available. Inadequate training data for one or more categories may result in incomplete or inadequate training of the recognition module 160. Continuing the example, with insufficient samples in the training data, users in the category of age 70-90 may experience poorer performance during recognition operations, compared to users in the category of age 20-30. Poor performance can result in the recognition being unsuitable for use, result in a poor user experience, and so forth.

Traditional training of machine learning systems for recognition involve training classification models, with each identity having a separate class. During training, each class that is maintained results in a substantial use of working memory, such as random access memory (RAM). As a result, training of these traditional systems does not scale well. For example, a traditional system may accommodate training using 10,000 identities, but would not scale to billions of identities due to limitations of working memory. Traditional training also does not facilitate ongoing training. As input image data 112 is acquired, the traditional machine learning system requires extensive retraining that again requires substantial working memory, as well as processor resources. Traditional training also involves persisting training data during a session, or from one training session to another. This results in a substantial demand for persistent memory, such as solid-state disk (SSD), hard disks, and so forth. Traditional systems also consume substantial bandwidth on a network between device(s) executing the training and storage device(s) that provide persistent memory. For example, transferring terabytes of persisted training data from a storage server to a processing server consumes substantial bandwidth on a local area network.

Described in this disclosure are techniques for training a recognition module 160 comprising a machine learning system using training data 152 comprising triplet data 154 that includes actual triplet data 156 based on input image data 112 and synthetic triplet data 158 based on synthetic image data 150 that is generated on an ad hoc basis for training. For example, the synthetic triplet data 158 may comprise at least one synthetic image. The synthetic triplet data 158 does not need to be persisted between iterations of training during a given training session, and does not need to be persisted between training sessions. The triplet data 154 may include associated category data (see FIG. 2.) The category data may comprise data indicative of one or more category types and associated category values that are associated with a triplet. For example, the category data associated with actual triplet data 156 may be provided by an actual user during enrollment or other acquisition of input image data 112.

In one implementation the recognition module 160 is trained using pairs of input image data 112, such as the first modality image data 114 and the second modality image data 116 that are associated with the same hand 102. For example, the recognition module 160 may include a first model that is trained to recognize images acquired using the first modality, such as surface features of the hand 102. Continuing the example, the recognition module 160 may include a second model that is trained to recognize images acquired using the second modality, such as veins of the hand 102. Output from the first model and the second model may be combined to determine an identity associated with the input image data 112. In another implementation the recognition module 160 is trained using the actual multimodal image data 124 provided by the multimodal image module 122. For example, the recognition module 160 may comprise a single model that is trained using the actual multimodal image data 124.

A synthetic image module 140 is trained using a relatively small set of input image data 112 to generate synthetic image data 150. The synthetic image module 140 may include an image generation module 142 and an image assessment module 144. The image generation module 142 may comprise a machine learning system that has been trained, using input image data 112 for different hands, to generate synthetic image data 150. The image generation module 142 may use a generative adversarial network (GAN), a variational autoencoder (VAE), or other techniques. Some implementations of GANs are described by Ian Goodfellow (Dec. 31, 2016), "NIPS 2016 Tutorial: Generative Adversarial Networks", arXiv:1701.00160. Some implementations of VAE are described by Carl Doersch (Jun. 19, 2016), "Tutorial on Variational Autoencoders", arXiv:1606.05908.

The image generation module 142 may be trained using a set of input image data 112 that is significantly smaller than the set of images used to train the recognition module 160. The machine learning system of the image generation module 142, once trained, is used to generate synthetic image data 150. For example, the image generation module 142 may be trained using input image data 112 from ten thousand different actual identities while the recognition module 160 may be trained using training data 152 that is representative of millions of different identities, both actual and synthetic. In this way, the synthetic image module 140 may be used to leverage a relatively small set of input image data 112 to generate training data 152 suitable for training the machine learning system of the recognition module 160.

An image assessment module 144 may assess the resulting synthetic image data 150. For example, the image assessment module 144 may use the recognition module 160, if available, to determine if the features of the synthetic image data 150 are sufficiently unique compared to features of previously processed images. Continuing the example, feature vectors determined from the synthetic image data 150 may be compared to previously stored feature vectors. If the synthetic image data 150 is deemed sufficiently unique, the synthetic image data 150 may be used for subsequent generation of training data 152.

In some implementations the synthetic image module 140 may be used to generate one or more triplets for the training data 152. For example, the synthetic image module 140 may generate synthetic images that represent an actual identity associated with input image data 112, but are presented with a different appearance. For example, the synthetic image data 150 may depict the features of an actual identity but in a different pose, lighting, apparent distance from the camera 108, and so forth.

The recognition module 160 comprises a machine learning system that may utilize a pairwise label-based loss function, such as a triplet loss function, during training. The training data 152 comprises a plurality of triplet data 154, including actual triplet data 156 that is based on input image data 112 and synthetic triplet data 158 that is based on the synthetic image data 150. Each triplet in the triplet data 154 includes an anchor sample, a positive sample, and a negative sample. For example, the anchor sample is associated with a first identity, the positive sample is also associated with the first identity but may differ in some features, while the negative sample is not associated with the first identity. The triplet data 154 is discussed in more detail with regard to FIG. 2.

The synthetic triplet data 158 may be generated on an ad hoc basis for an iteration of training of the recognition module 160 and discarded after use during the iteration of training is complete. For example, the training data 152 for a first iteration of training of the recognition module 160 may comprise a first set of actual triplet data 156 and a first set of synthetic triplet data 158. The first set of synthetic triplet data 158 is generated based on synthetic image data 150 produced by the synthetic image module 140 on demand. By producing the synthetic triplet data 158 on demand, the need to store and retrieve synthetic data from persistent storage is eliminated, substantially reducing data storage and transfer requirements. For example, network bandwidth is not needed to transfer previously stored synthetic data from storage server(s) to the server(s) executing the recognition module 160. Once an iteration of training is complete, the first set of synthetic triplet data 158 is discarded. The actual triplet data 156 may be stored in persistent storage for future training iterations.

The recognition module 160 may comprise a machine learning system that is trained to determine an identity associated with the image(s) provided to it. During a training phase, the machine learning system of the recognition module 160 may be trained using the training data 152. Each triplet in the triplet data 154 is associated with at least two identities. These identities may be absolute or arbitrary, serving to distinguish one identity from another and may be actual or synthetic. For example, actual triplet data 156 that is based on the input image data 112 may have an anchor sample that is representative of the hand 102 of a particular user. In comparison, synthetic triplet data 158 may have an anchor sample that is representative of a synthetic identity associated with the synthetic image data 150.

During a production phase, the trained recognition module 160 may accept as input the input image data 112 acquired by a scanner 104. The recognition module 160 may use an embedding module 162 to determine vector data 164. The vector data 164 may be considered a set of values that are descriptive of the hand 102 or other object depicted in the input image data 112, and may act as a signature that is uniquely associated with the identity of the user.

The embedding module 162 may comprise a neural network that utilizes a margin-loss based model for training. One implementation of margin-loss models for training neural networks are described by Gao, R., Yang, F., Yang, W., & Liao, Q. "Margin loss: Making faces more separable", *IEEE Signal Processing Letters,* 25(2), 308-312, 2018. Another implementation of margin-loss models for training convolutional neural networks are described by Liu, W., Wen, Y., Yu, Z., & Yang M., "Large margin softmax loss for convolutional neural networks". *International Conference on Machine Learning,* (Vol. 2, No. 3, p. 7, June 2016).

A comparison module 166 may compare the vector data 164 from the input image data 112 with previously stored signatures, each signature comprising vector data 164 that is associated with a particular user. A confidence value may be determined that is indicative of similarity between the vector data 164 and a reference signature that has been previously stored. For example, the confidence value may be determined based on a Euclidean distance in the vector space between the vector data 164 from the input image data 112 and the reference signature. In other implementations, other techniques may be used to compare the input image data 112 or features therein with previously stored data.

As discussed earlier, in some implementations the image assessment module 144 may use a previously trained version of the recognition module 160 to determine if the synthetic triplet data 158 is deemed to be sufficiently unique relative to previously stored vector data 164. For example, the synthetic image data 150 may be processed using the previously trained version of the recognition module 160 to determine if the synthetic identity is too similar to a previously generated synthetic identity or actual identity. Synthetic triplet data 158 that is not sufficiently unique may be disregarded and not used for subsequent generation of synthetic image data 150.

The comparison module 166 may use the vector data 164 produced by the embedding module 162 to determine recognition data 168. The recognition data 168 may comprise information that is indicative of a likelihood that image data provided as input to the recognition module 160 corresponds to previously stored vector data 164. The recognition data 168 may comprise a confidence value indicative of likelihood that the identification is accurate and a user identifier. For example, the recognition data 168 may indicate "{confidence}=0.97,{useridentifier}=6c6f6d616e2c770a0a". The recognition data 168 may be compared to vector data 164 associated with actual users during production use, or vector data 164 corresponding to a synthetic identity associated with the synthetic image data 150 during training and assessment of training.

In one implementation, during an enrollment phase, a user may present their hand 102. Additional information may be obtained from the user, such as name, contact information, demographic data, payment account information, and so forth. An identity of a particular user may be asserted with the input image data 112, and the vector data 164 data associated with that particular user. During subsequent interactions, the user ay present their hand 102 at a scanner 104. The resulting input image data 112 may be processed by the recognition module 160 to determine that the input image data 112 corresponds to within a threshold value of previously stored data. For example, if the vector data 164 corresponding to the input image data 112 presented by the user is within a threshold distance in the vector space of a previously stored vector, the identity associated the previously stored vector may be asserted to the user in the recognition data 168.

A recognition assessment module 170 may be used to determine assessment data 172 that is indicative of performance of the recognition module 160. The recognition data 168 may be compared to one or more thresholds to determine the assessment data 172. For example, the assessment data 172 may indicate that an average confidence value associated with the produced recognition data 168 is less than a threshold value. A training data request module 174 may determine, based on the assessment data 172, a training data request 178. For example, if the assessment data 172 indicates that the average confidence value for a first set of training data 152 is less than a threshold value, the training data request module 174 may generate a training data request 178. The training data request 178 may be provided to the synthetic image module 140 that determines, based on the training data request 178, a second set of synthetic triplet data 158 that may be subsequently used as training data 152.

In some implementations, the recognition assessment module 170 may determine that performance of the recognition module 160 with respect to one or more category types is inadequate. For example, during evaluation of the recognition module 160, triplet data 154 associated with a category type of age 70-90 may have an average confidence value that is less than a threshold value that is deemed adequate. The training data request module 174 may generate a training data request 178 that is indicative of the category type of age 70-90.

Responsive to the training data request 178, the synthetic image module 140 may generate additional synthetic image data 150 that includes more synthetic triplet data 158 that is associated with the category type of age 70-90. Synthetic triplet data 158 may be generated using the synthetic image data 150, resulting in a second set of training data 152 that differs from the first set of training data 152 previously used. For example, the synthetic image module 140 may increase the percentage of synthetic triplet data 158 for the category type of age 70-90, providing additional samples of this category type for the recognition module 160 to be trained with. The recognition module 160 may be subsequently trained using this second set of training data 152. The presence of the additional synthetic examples of the particular category type may result in improved performance of the recognition module 160 while processing data associated with that category type.

As additional users are enrolled in the system 100, additional input image data 112 becomes available. This additional input image data 112 may be used to determine additional actual triplet data 156 that may be used in subsequent training of the recognition module 160. The recognition assessment module 170 allows the system 100 to recognize inadequate performance with regard to particular category types and iteratively improve performance. During subsequent training, the system may use at least a portion of actual triplet data 156 from recently acquired input image data 112, previously stored actual triplet data 156, as well as synthetic triplet data 158 associated with synthetic image data 150 that is generated in an ad hoc basis.

During operation of the recognition module 160, a user identifier that is associated with the reference signature that is most similar to the input image data 112 may be determined to be the identity of the user. The comparison module 166 may produce the recognition data 168 during production use. For example, the user identifier associated with the reference signature may be associated with the user who presented their hand 102.

The recognition data 168 may provide information such as one or more of a user identifier associated with the user, a location or identification of the scanner 104, data indicative of date and time that the input image data 112 was obtained, and so forth. The recognition data 168 may be subsequently used for various purposes. For example, if the user has been granted access to the facility, a command may be issued to open a gate or door so the user may enter the facility. In another example, the recognition data 168 may be used to determine a payment account or other credentials associated with the user which may then be used in a financial transaction. In yet another example, the recognition data 168 may be passed to a facility management module 180.

The facility management module 180 may use the recognition data 168 to associate an identity with the user as they move about the facility. For example, the facility management module 180 may use data from cameras or other sensors in the environment to determine a location of the user. Given a known path of the user from the gate, the user identity indicated in the recognition data 168 may be associated with the user as they use the facility. For example, the now identified user may walk to a shelf, remove an item, and leave the facility. The facility management module 180 may determine the interaction data indicative of the removal of the item as being associated with the user identifier specified in the recognition data 168, and bill an account associated with the user identifier.

The systems and techniques described above are discussed with respect to images of human hands. These systems and techniques may be used with respect to other forms of image data such as multimodal data, other kinds of objects, and so forth.

Figure 2:
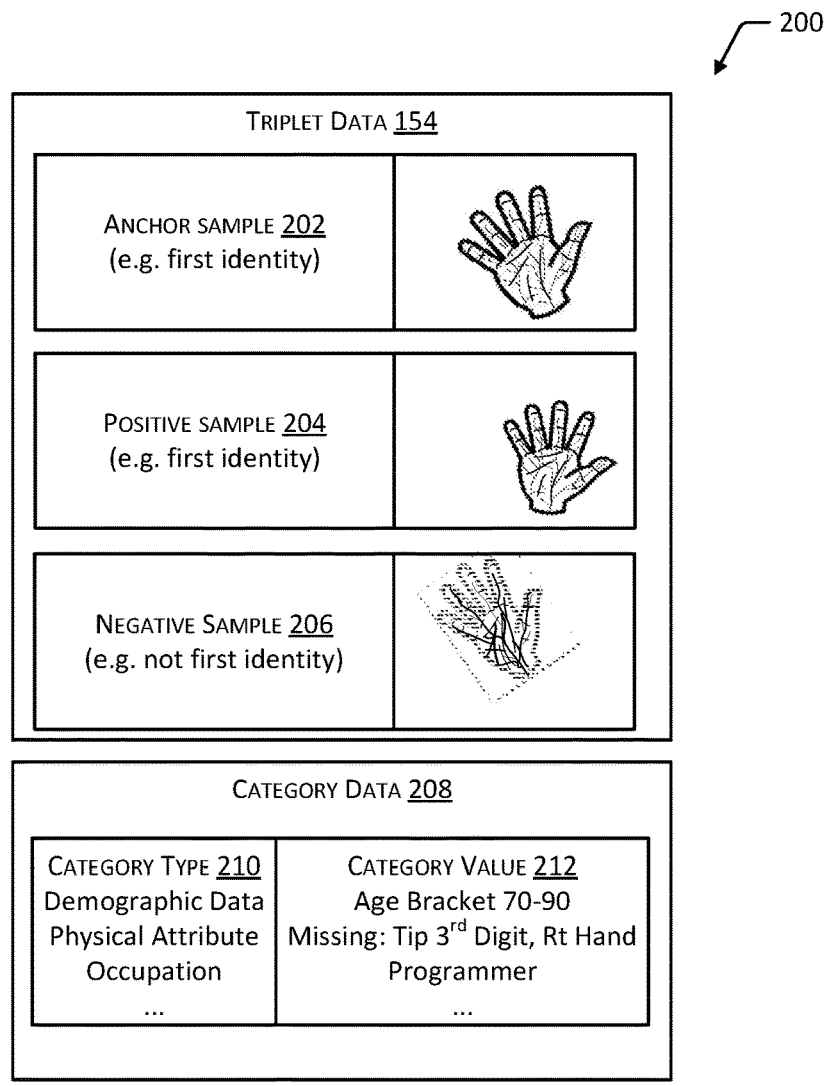
FIG. 2 illustrates triplet data that is used to train the machine learning system, and relative points in vector space that are associated with the samples in the triplet, according to some implementations.
Figure 2:
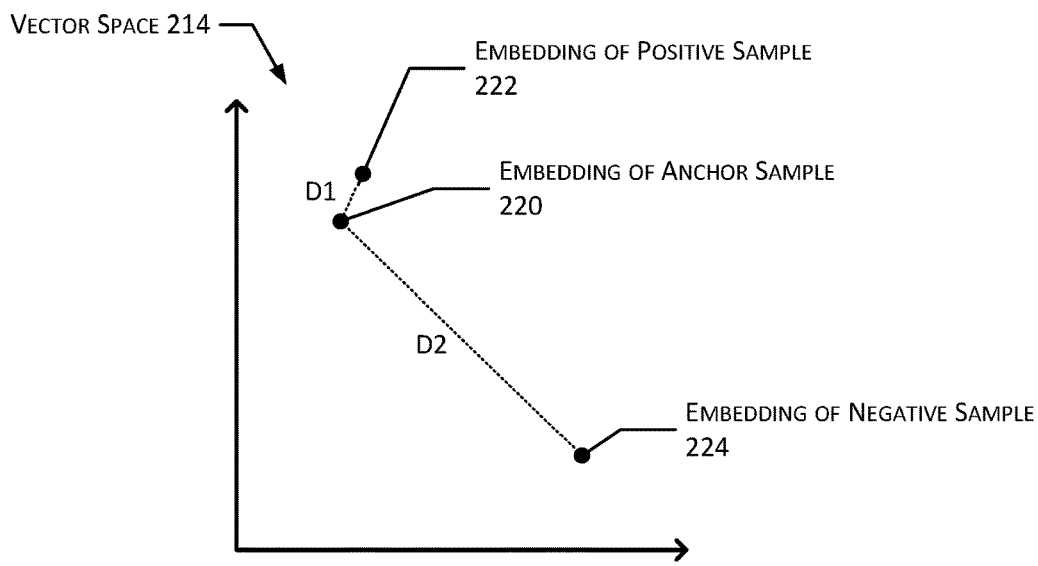

FIG. 2 illustrates triplet data 154 that is used to train the recognition module 160 or a portion thereof. Also depicted are relative points in vector space that are associated with the samples in the triplet, according to some implementations.

The triplet data 154 may be generated based on one or more of input image data 112 or synthetic image data 150. For example, actual triplet data 156 may be based on input image data 112, while synthetic triplet data 158 may be based on synthetic image data 150. In some situations, the synthetic triplet data 158 may include both actual and synthetic data. For example, the synthetic triple data 158 may comprise input image data 112 and synthetic image data 150.

Each triplet in the triplet data 154 includes an anchor sample 202, a positive sample 204, and a negative sample 206. The samples may comprise single or multimodal image data that may be actual or synthetic. The anchor sample 202 and the positive sample 204 are each associated with the same identity. For example, the anchor sample 202 and the positive sample 204 may manifest the same or very similar features that are consistent with the same hand 102. In another example, the anchor sample 202 and the positive sample 204 may have respective vectors in the same vector space that are within a threshold distance of one another. The anchor sample 202 and the positive sample 204 may differ from one another in appearance. For example, the positive sample 204 may have a different pose, apparent lighting, and so forth compared to the anchor sample 202.

The negative sample 206, in comparison, is not associated with the same identity as the anchor sample 202 and the positive sample 204. For example, the negative sample 206 and the anchor sample 202 may manifest different features that are consistent with different hands 102. In another example, the negative sample 206 and the anchor sample 202 may have respective vectors in the same vector space that are at least some threshold distance of one another. The negative sample 206 and the anchor sample 202 may have the same appearance or different appearance. For example, the negative sample 206 and the anchor sample 202 may have the same pose. In another example, the samples may comprise a coarse features and fine features. For example, coarse features may comprise features having a size or frequency that is greater than a threshold value while fine features may have a size or frequency that is less than the threshold value. The negative sample 206 may comprise a first set of coarse features and a second set of fine features. One or more of the anchor sample 202 or the positive sample 204 may include the first set of coarse features and a third set of fine features, while the negative sample 206 includes a fourth set of fine features. For example, the negative sample 206 and the anchor sample 202 may have the same coarse features such as pose, illumination, articulation, and so forth but have different fine details such as the arrangement of creases and veins on the hand.

One or more of the triplets in the triplet data 154 may be associated with category data 208. The category data 208 may comprise a category type 210 and associated category value(s) 212. For example, the category types 210 may include, but are not limited to, demographic data, physical attribute, occupation, and so forth. The demographic data may comprise information including, but not limited to age, residence, gender, ethnicity, and so forth. Data about the physical attributes may include information indicative of scars, tattoos, birthmarks, missing digits, and so forth. For example, the physical attribute data associated with the hand 102 may indicate that a tip of a particular finger is missing on the right hand. The category data 208 may be associated with factors that could affect operation of the system 100. For example, occupation data may be used to facilitate recognition of users who are involved in occupations that may change the physical appearance of theirs hands. Continuing the example, users who have the occupation "bricklayer" may have more callouses and thus different features on their hands than users who have the occupation "programmer".

A user may choose to opt in during enrollment and provide category values 212 for at least a portion of the category data 208. For example, while setting up an account, the user may choose to enter their occupation. As described with regard to FIG. 1, the category data 208 may be used to facilitate subsequent iterations of training the recognition module 160.

Also depicted in FIG. 2 is an example of a vector space 214 used by the recognition module 160. The vector space 214 depicted is two-dimensional for ease of illustration and not by way of limitation. For example, the recognition module 160 may express vector data 164 within an n-dimensional space.

Embedding or vector data 164 associated with the anchor sample 220, the positive sample 222, and the negative sample 224 are shown. Within the vector space 214, the embedding of the positive sample 222 is a distance D1 from the embedding of the anchor sample 220. This distance D1 is less than a threshold value that is deemed to be associated with the same identity. In comparison, the embedding of the negative sample 224 is a distance D2 from the embedding of the anchor sample 220. This distance D2 is greater than the distance D1, and is outside of the threshold value deemed to be associated with the same identity.

In some implementations hybrid triplet data may be generated. For example, the triplet data 154 may comprise an anchor sample 202 that is input image data 112, while the positive sample 204 comprises a synthetic image data 150 that is based on the actual input image data 112 but expressing the same or similar features of the user depicted in the input image data 112. In another example, the triplet data 154 may comprise an anchor sample 202 and positive sample 204 produced by the synthetic image module 140 while the negative sample 206 is input image data 112.

Figure 3:
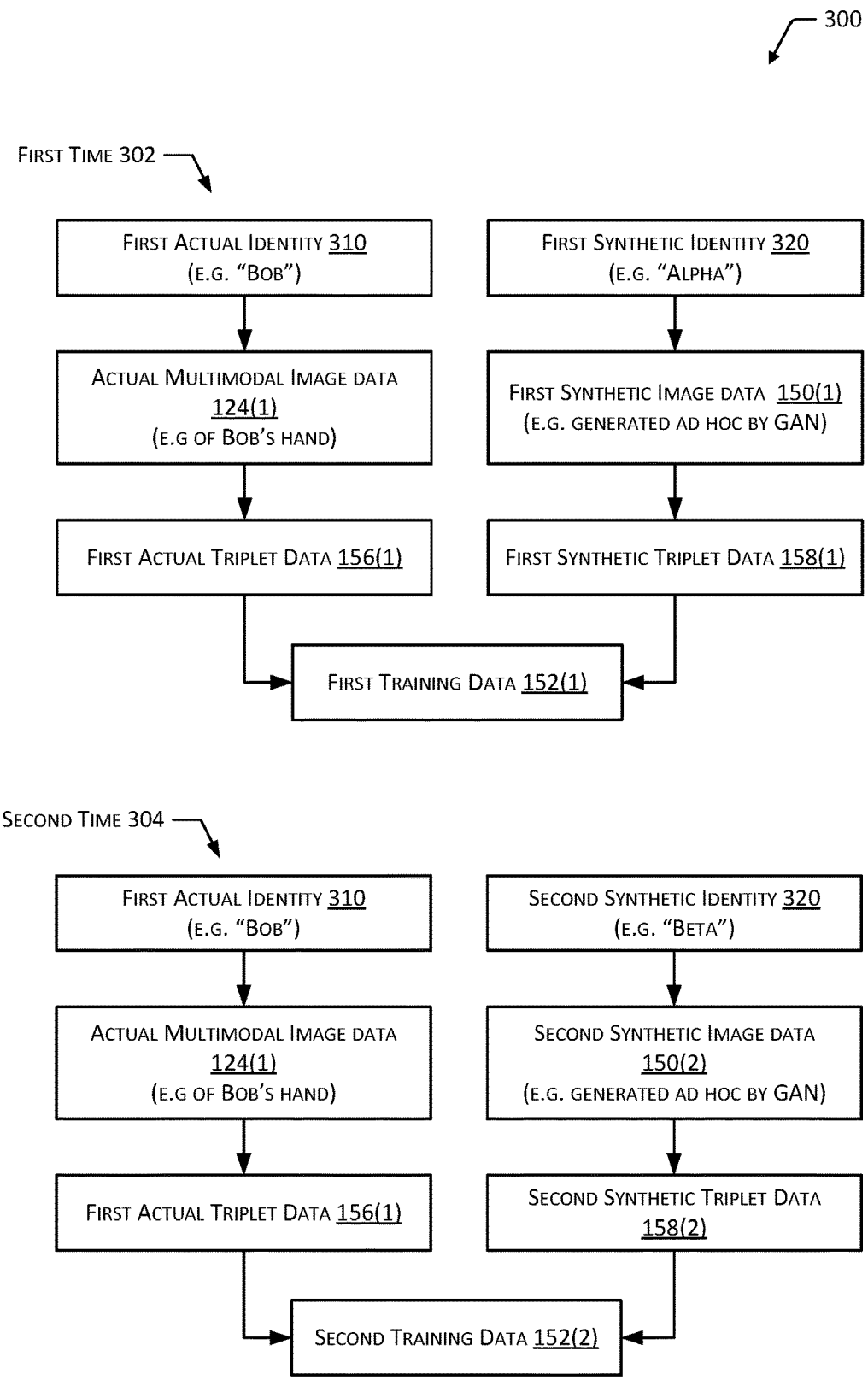
FIG. 3 illustrates determining a first set of training data that includes a first synthetic triplet generated on an ad hoc basis, as well as a second set of training data that includes a second synthetic triplet also generated on an ad hoc basis, according to some implementations.

FIG. 3 illustrates determining a first set of training data 152(1) that includes a first synthetic triplet generated on an ad hoc basis, as well as a second set of training data 152(2) that includes a second synthetic triplet also generated on an ad hoc basis, according to some implementations.

At a first time 302, a first actual identity 310 for user "Bob" is depicted. The scanner 104 is used to acquire first input image data 112 of "Bob" that is used to determine first input image data 112(1) of "Bob's" hand 102. The first input image data 112(1) is used to determine first actual triplet data 156(1). For example, the anchor sample 202 may be based on first input image data 112(1) while the positive sample 204 is based on second input image data 112(2). The negative sample 206 may comprise input image data 112 that is associated with user "Charlie". This first actual triplet data 156(1) is included in the first training data 152(1).

Responsive to a request to generate synthetic image data 150, the synthetic image module 140 may determine a first synthetic identity 320 for synthetic user "Alpha". For example, the synthetic image module 140 may generate random vector data 164 within the vector space 214. The synthetic image module 140 generates a first synthetic image data 150(1) based on the first synthetic identity 320. The first synthetic image data 150(1) is used to determine first synthetic triplet data 158(1). For example, the anchor sample 202 may be based on the first synthetic image data 150(1) while the positive sample 204 is based on a second synthetic image data 150(2) that comprises the same or similar features of the synthetic user "Alpha". The negative sample 206 may comprise third synthetic image data 150(3) that is associated with a second synthetic identity "Beta". This first synthetic triplet data 158(1) is also included in the first training data 152(1). The synthetic triplet data 158 may include actual input image data 112 in some situations. Continuing the earlier example, the negative sample 206 in the first synthetic triple data 158(1) may comprise input image data 112 that is associated with an actual identity "Roy".

The first training data 152(1) comprises a plurality of actual triplet data 156 and a plurality of synthetic triplet data 158. For example, the first training data 152(1) may comprise twenty thousand triplets of actual triplet data 156 and two billion triplets of synthetic triplet data 158. In implementations in which the recognition module 160 does not use classification models, training may be performed using a very large number of identities, both actual and synthetic. For example, a classification model-based system requires each identity being associated with a separate class, resulting in substantial demands for working storage and subsequent processing. In comparison, the use of triplet data 154 allows for training involving extremely large sets of training data. Additionally, the triplet data 154 does not need to be persisted between iterations of training. The first training data 152(1) may be used to train the recognition module 160 during a first iteration. This is illustrated at the second time 304.

At the second time 304, the first actual identity 310 may be used again. The first actual triplet data 156(1) may be used again and included in second training data 152(2). In some implementations second actual triplet data 156(2) may differ from the first actual triplet data 156(1). For example, different input image data 112 of the user "Bob" may be used, a different positive sample 204 may be used, and a different negative sample 206 may be used.

Responsive to a request to generate synthetic image data 150, the synthetic image module 140 may determine a second synthetic identity 320 for synthetic user "Beta". For example, the synthetic image module 140 may generate random vector data 164 within the vector space 214. The synthetic image module 140 generates a second synthetic image data 150(2) based on the second synthetic identity 320. The second synthetic image data 150(2) is used to determine second synthetic triplet data 158(2). For example, the anchor sample 202 may be based on the second synthetic image data 150(2) while the positive sample 204 is based on a second synthetic image data 150(2) that comprises the same or similar features of the synthetic user "Beta". The negative sample 206 may comprise third synthetic image data 150(3) that is associated with a second synthetic identity "Gamma". This second synthetic triplet data 158(2) is also included in the second training data 152(2).

The second training data 152(2) comprises a plurality of actual triplet data 156 and a plurality of synthetic triplet data 158. For example, the second training data 152(2) may comprise thirty thousand triplets of actual triplet data 156 and three billion triplets of synthetic triplet data 158. The second training data 152(2) may be used to train the recognition module 160 during a second iteration. This is illustrated at the second time 304.

As a result, at each iteration of training the recognition module 160, the training data 152 may differ from the training data 152 used in previous iterations. The synthetic triplet data 158 is not stored in persistent memory and is not be re-used. Instead, the synthetic triplet data 158, the corresponding synthetic image data 150, and the synthetic identities are generated on an ad hoc basis, on demand.

Figure 4:
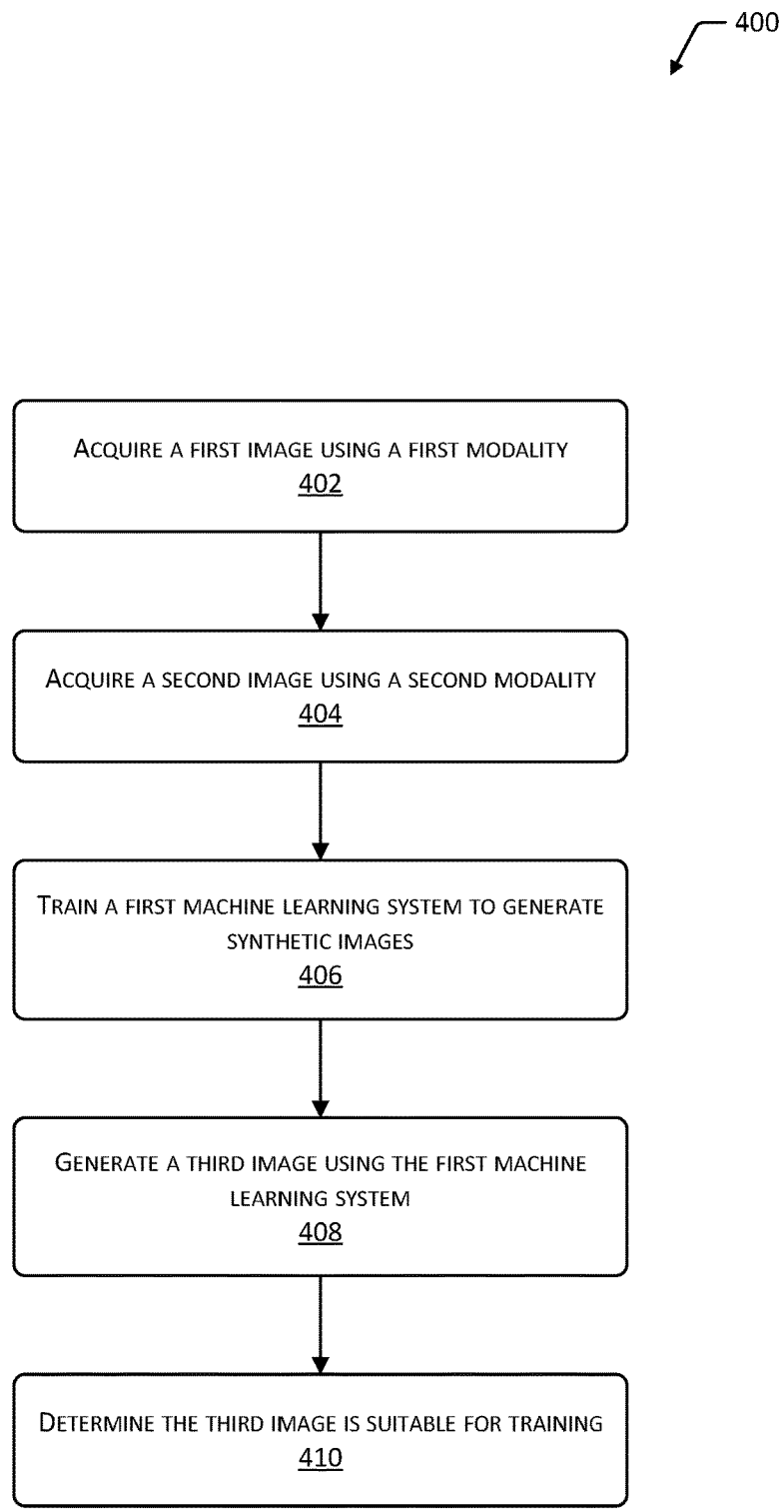
FIG. 4 is a flow diagram of a process to generate synthetic data for use in synthetic triplet data, according to some implementations.

FIG. 4 is a flow diagram 400 of a process to generate synthetic data for use in synthetic triplet data 158, according to some implementations. The process may be implemented at least in part by one or more computing devices executing the synthetic image module 140.

At 402 a first image of a first hand 102 is acquired using a first modality. For example, the scanner 104 may be used to generate a first modality image data 114 at a first time.

At 404 a second image of the first hand 102 is acquired using a second modality. For example, the scanner 104 may be used to generate a second modality image data 116 at a second time. In other implementations data using additional modalities may be acquired as well.

At 406 a machine learning system is trained to generate synthetic images. For example, the input image data 112 may be used to train a generative adversarial network (GAN) in the image generation module 142 to generate the synthetic image data 150.

At 408, a third image is generated using the machine learning system. For example, responsive to the training request data 178, the image generation module 142 may be used to generate the synthetic image data 150.

At 412 the third image is determined to be suitable for training. For example, the image assessment module 144 may use the recognition module 160 to determine if the synthetic image data 150 that has been generated is sufficiently unique with respect to other previously stored vector data 164.

Figure 5:
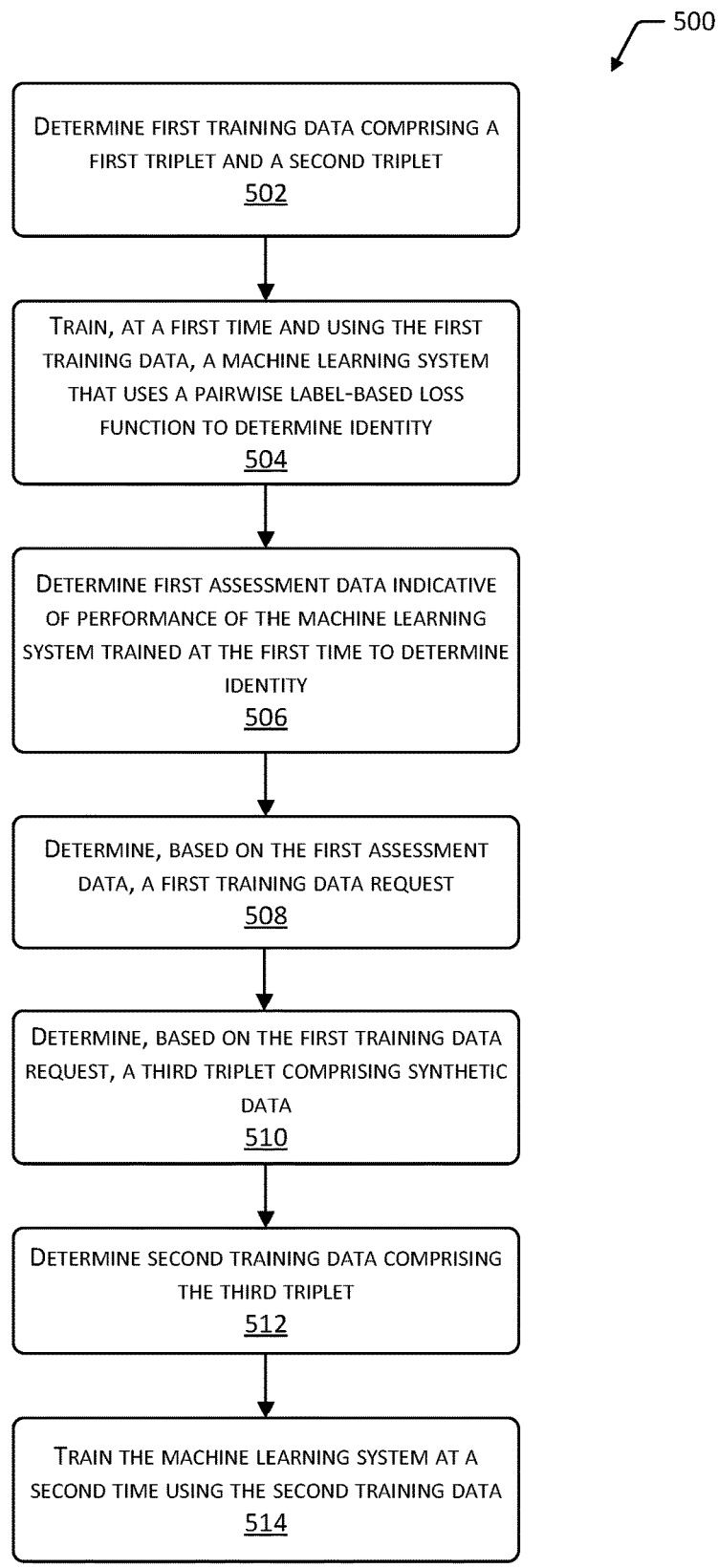
FIG. 5 is a flow diagram of training and retraining, using synthetic triplet data, a machine learning system to generate recognition data, according to some implementations.

FIG. 5 is a flow diagram 400 of training and retraining, using synthetic triplet data 158, a machine learning system to generate recognition data, according to some implementations. The process may be implemented at least in part by one or more computing devices of the system 100.

At 502 first training data 152(1) is determined that comprises a first triplet and a second triplet. For example, a first plurality of triplets may be determined wherein each triplet of the first plurality comprises actual triplet data 156. Continuing the example, a second plurality of triplets may be determined wherein at least one triplet of the second plurality comprises synthetic triplet data 158. For example, the second plurality of triplets may include a synthetic anchor sample 202, a synthetic positive sample 204, and an actual negative sample 206. In another example, the second plurality of triplets may include an actual anchor sample 202 from the input image data 112, a synthetic positive sample 204 based on the input image data 112, and an actual negative sample 206.

At 504, at a first time and using the first plurality of triplets and a second plurality of triplets, a machine learning system such as the recognition module 160 is trained. The machine learning system may comprise a neural network that uses a first loss function for training. The first loss function may comprise a pairwise label-based loss function in which each triplet consists of an anchor sample 202, a positive sample 204, and a negative sample 206. The recognition module 160 is trained to generate recognition data 168 based on input, such as single or multimodal image data.

At 506 first assessment data 172(1) is determined that is indicative of performance of the machine learning system trained at the first time. For example, the first assessment data 172(1) may indicate that confidence values of recognition of triplets associated with one or more category values 212 of particular category types 210 are less than a threshold value. Continuing the example, the first assessment data 172(1) may indicate that the average confidence value in recognition for triplets associated with the category type 210 "demographic data" and category value 212 "age bracket 70-90" was less than a threshold value.

At 508, based on the first assessment data 172(1), a first training data request 178(1) is generated. For example, a training data request 178 may indicate that subsequent training data 152 should include additional samples that are associated with the category type 210 "demographic data" associated with category value 212 "age bracket 70-90". In some implementations the training data request 178 may be generated at one or more of: during an iteration of training during a training session, after the iteration of the training session is complete, or after the training session is complete.

At 510, based on the first training data request 178(1), a third plurality of triplets are determined, wherein each triplet of the third plurality comprises synthetic triplet data 158. For example, the synthetic image module 140 may generate synthetic image data 150 that includes a greater number of samples of synthetic images depicting synthetized hands that are consistent with synthetic users in the "age bracket 70-90". In some implementations the training request data 178 may include information such as an identity vector, appearance vector, and so forth.

At 512, second training data 152(2) is determined comprising the third plurality of triplets. For example, the second training data 152(2) may include at least a portion of the first plurality of triplets and at least a portion of the third plurality of triplets.

At 514, at a second time and using at least a portion of the first plurality of triplets and at least a portion of the third plurality of triplets, the machine learning system is trained again. For example, a first plurality of actual triplet data 156 may be retrieved from persistent storage while the third plurality of triplets of synthetic triplet data 158 that were generated on demand are used.

Figure 6:
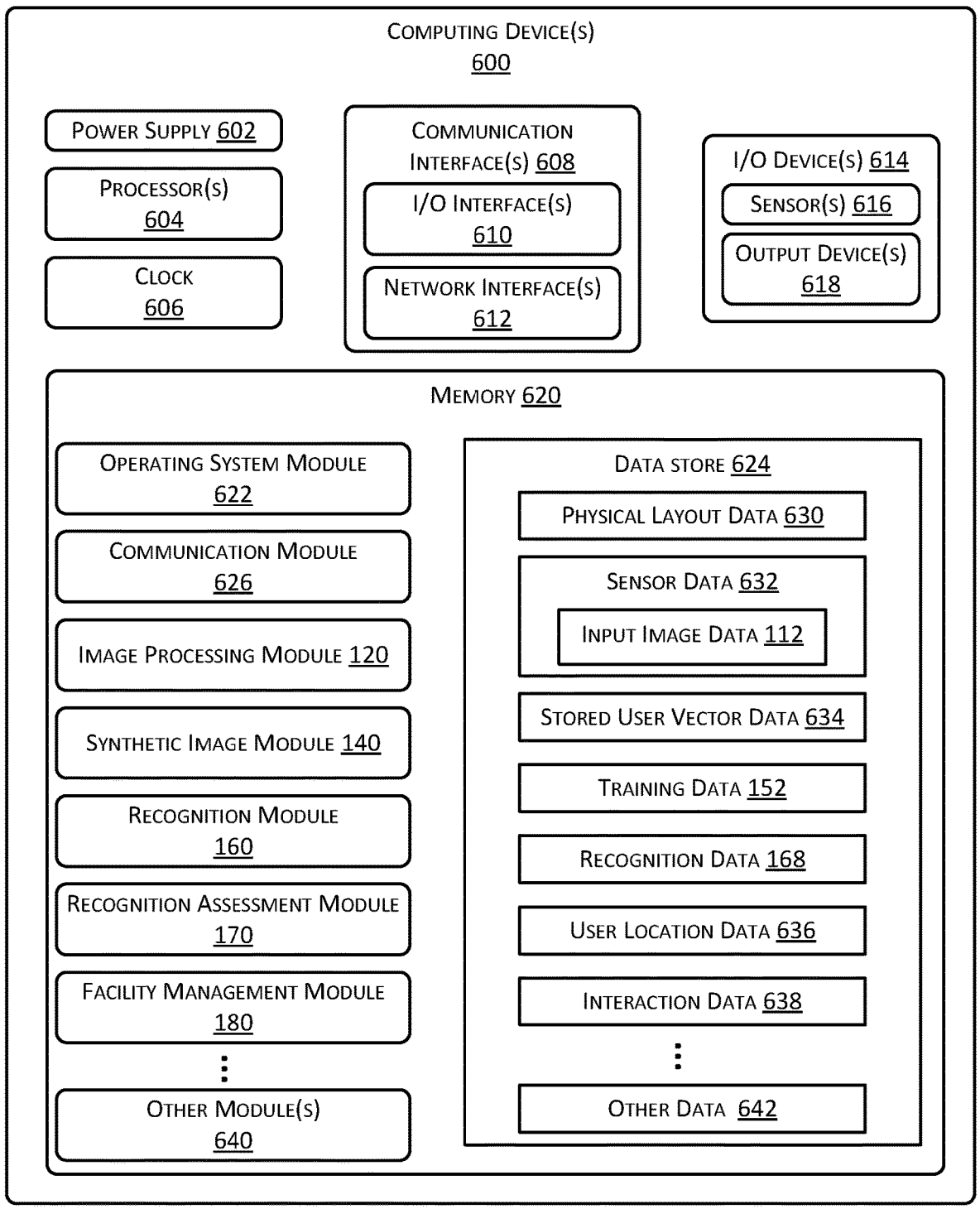
FIG. 6 is a block diagram of a computing device to use synthetic training data for training of a machine learning system, according to some implementations.

FIG. 6 is a block diagram of a computing device 600 to use synthetic training data 158 for training of a machine learning system to perform recognition, according to some implementations.

The computing device 600 may be within the scanner 104, may comprise a server, and so forth. The computing device 600 may be physically present at the facility, may be accessible by a network, or a combination of both. The computing device 600 does not require end-user knowledge of the physical location and configuration of the system that delivers the services. Common expressions associated with the computing device 600 may include "embedded system", "on-demand computing", "software as a service (SaaS)", "platform computing", "network-accessible platform", "cloud services", "data centers", and so forth. Services provided by the computing device 600 may be distributed across one or more physical or virtual devices.

One or more power supplies 602 may be configured to provide electrical power suitable for operating the components in the computing device 600. The one or more power supplies 602 may comprise batteries, capacitors, fuel cells, photovoltaic cells, wireless power receivers, conductive couplings suitable for attachment to a power source such as provided by an electric utility, and so forth. The computing device 600 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The computing device 600 may include one or more communication interfaces 608 such as input/output (I/O) interfaces 610, network interfaces 612, and so forth. The communication interfaces 608 enable the computing device 600, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 616, keyboard, mouse, scanner, and so forth. The I/O devices 614 may also include output devices 618 such as one or more of a display device, printer, audio speakers, and so forth. In some embodiments, the I/O devices 614 may be physically incorporated with the computing device 600 or may be externally placed.

The network interfaces 612 may be configured to provide communications between the computing device 600 and other devices, such as carts, routers, access points, and so forth. The network interfaces 612 may include devices configured to couple to personal area networks (PANS), local area networks (LANs), wireless local area networks (WLANS), wide area networks (WANs), and so forth. For example, the network interfaces 612 may include devices compatible with Ethernet, Wi-Fi, Bluetooth, ZigBee, and so forth.

The computing device 600 may also include one or more busses or other internal communications hardware or software that allow for the transfer of data between the various modules and components of the computing device 600.

As shown in FIG. 6, the computing device 600 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 600. A few example functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 620 may be a data store 624 and one or more of the following modules. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including the computing devices 600, network attached storage devices, and so forth.

A communication module 626 may be configured to establish communications with one or more of the carts, sensors 616, display devices, other computing devices 600, or other devices. The communications may be authenticated, encrypted, and so forth.

The memory 620 may also store one or more of the image processing module 120, the synthetic image module 140, the recognition module 160, and the recognition assessment module 170, as described above.

The memory 620 may store the facility management module 180. The facility management module 180 may perform various functions, such as tracking items between different inventory locations or to and from the carts, generating restocking orders, directing operation of robots within the facility, using the recognition data 168 to associate a particular user identity with a user in the facility, and so forth. During operation, the facility management module 180 may access sensor data 632 such as one or more of image data from cameras, weight data from weight sensors, and so forth.

Information used by the facility management module 180 may be stored in the data store 624. For example, the data store 624 may be used to store physical layout data 630, sensor data 632, stored user vector data 634, recognition data 168, user location data 636, interaction data 638, and so forth.

The physical layout data 630 may provide information indicative of where scanners 104, cameras, weight sensors, antennas for radio receivers, inventory locations, and so forth are in the facility with respect to one another. For example, the physical layout data 630 may comprise information representative of a map or floor plan of the facility with relative positions of gates with scanners 104 and inventory locations.

The sensor data 632 may comprise information obtained from one or more of the sensors 616 in or associated with the facility.

The stored user vector data 634 may comprise vector data associated with particular user accounts. For example, the stored user vector data 634 may comprise vector data 164 that associates particular signatures of features with particular user accounts.

The facility management module 180 may generate the user location data 636 that is indicative of the location of the user within the facility. For example, the facility management module 180 may use image data obtained by the cameras to determine a location of the user. In other implementations, other techniques may be used for determining the user location data 636. For example, data from a smart floor may be used to determine the location of the user.

A user identity may be associated with user location data 636 based on the recognition data 168. For example, the user enters the facility and has their palm scanned, producing recognition data 168 that is indicative of their time of entry, a scanner 104 associated with where they entered, and their user identifier. The user location data 636 indicative of a path of a user that begins at the scanner 104 at the time of entry may be associated with the user identifier in the recognition data 168.

Based on the user location data 636 and the interaction data 638, a particular interaction may be associated with an account of a particular user. For example, if the user location data 636 indicates that the user is present in front of inventory location 492 at time 17:47:20 and the interaction data 638 indicates a pick of a quantity of one item from an area on inventory location 492 at 17:47:27, the user may be billed for that pick.

The facility management module 180 may use the sensor data 632 to generate the interaction data 638. The interaction data 638 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 180 may generate interaction data 638 that indicates what item the user picked from a particular lane on a shelf, and then use this interaction data 638 to adjust the count of inventory stowed at that lane. The interaction data 638 may then be used to bill an account associated with the user identifier that is associated with the user who picked the item.

The facility management module 180 may process the sensor data 632 and generate output data. For example, based on the interaction data 638, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 640 may also be present in the memory 620 as well as other data 642 in the data store 624. For example, a billing module may use the interaction data 638 and the recognition data 168 to bill an account associated with a particular user.

The devices and techniques described in this disclosure may be used in a variety of other settings. For example, the system may be used in conjunction with a point-of-sale (POS) device. The user may present their hand 102 to a scanner 104 to provide an indication of intent and authorization to pay with an account associated with the recognition data 168. In another example, a robot may incorporate a scanner 104. The robot may use the recognition data 168 to determine whether to deliver a parcel to the user, and based on the recognition data 168, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a memory, storing first computer-executable instructions; and
one or more hardware processors to execute the first computer-executable instructions to:
acquire actual data comprising a first set of images;
determine a first plurality of triplets, wherein each triplet of the first plurality of triplets comprises at least a portion of the actual data;
generate a second plurality of triplets, wherein at least one triplet of the second plurality of triplets comprises first synthetic data;
train, at a first time and using the first plurality of triplets and the second plurality of triplets, a machine learning system that uses a first loss function, wherein the machine learning system generates recognition data that is indicative of determines an identity of a user;
determine first assessment data indicative of performance of the machine learning system trained at the first time;
based on the first assessment data, generate a first training request third plurality of triplets, wherein each triplet of the third plurality of triplets comprises second synthetic data; and
train, at a second time and using the first plurality of triplets and the third plurality of triplets, the machine learning system.

2. The system of claim 1, wherein the first assessment data is indicative of a first category associated with one or more users that are either actual or synthetic.

3. The system of claim 1, wherein the first assessment data is indicative of a first category; and the one or more hardware processors to further execute the first computer-executable instructions to:
generate, based at least in part on the first category, the second synthetic data;
wherein the first category is indicative of one or more of:
demographic data,
a physical attribute, or
an occupation.

4. The system of claim 1, wherein:
the each triplet of the first plurality of triplets further comprises:
an anchor sample associated with a first identity,
a positive sample associated with the first identity,
a negative sample that is not associated with the first identity; and
the negative sample comprises one of:
a same pose as one or more of the anchor sample or the positive sample, or
a first set of coarse features and a second set of fine features, wherein:
one or more of the anchor sample or the positive sample include the first set of coarse features and a third set of fine features, and
the negative sample includes a fourth set of fine features.

5. A computer-implemented method comprising:
- determining first training data comprising a first triplet and a second triplet, wherein the first triplet comprises actual data and the second triplet comprises synthetic data;
- training, at a first time and using the first training data, a machine learning system that uses a first loss function, wherein the machine learning system generates recognition data that is indicative of an identity of a user;
- determining first assessment data indicative of performance of the machine learning system trained at the first time;
- determining, based on the first assessment data, a first training data request;
- determining, based on the first training data request, a third triplet comprising synthetic data;
- determining second training data comprising the third triplet; and
- training, at a second time and using the second training data, the machine learning system.

6. The method of claim 5, wherein the first loss function comprises a pairwise label-based loss function in which each triplet consists of an anchor sample, a positive sample, and a negative sample.

7. The method of claim 5, wherein each triplet comprises:
- an anchor sample associated with a first identity;
- a positive sample associated with the first identity; and
- a negative sample that is not associated with the first identity.

8. The method of claim 7, wherein the negative sample comprises one of:
- a same pose as one or more of the anchor sample or the positive sample; or
  - a first set of coarse features and a second set of fine features, wherein: one or more of the anchor sample or the positive sample include the first set of
  - coarse features and a third set of fine features; and the negative sample includes a fourth set of fine features.

9. The method of claim 5, further comprising:
- generating at least a portion of the second triplet using a generative adversarial network (GAN); and
- wherein the second training data omits the second triplet.

10. The method of claim 5, further comprising:
- determining a first category associated with at least a portion of the first training data;
- wherein the first assessment data is indicative of a determination of recognition data that is associated with the first category being less than a threshold value; and
- wherein the third triplet is representative of the first category.

11. The method of claim 10, wherein the first category is indicative of one or more of:
- demographic data,
- a physical attribute, or
- an occupation.

12. The method of claim 5, further comprising:
- illuminating, at a first time, a hand with light having a first polarization;
- acquiring a first image of the hand using a camera with the first polarization;
- illuminating, at a second time, the hand with light having a second polarization;
- acquiring a second image of the hand using the camera with the first polarization; and
- determining the actual data based on the first image and the second image.

13. A computer-implemented method comprising:
- determining a first plurality of triplets, wherein each triplet of the first plurality comprises actual data;
- generating a second plurality of triplets, wherein at least one triplet of the second plurality comprises synthetic data;
- training, at a first time and using the first plurality of triplets and the second plurality of triplets, a machine learning system that uses a first loss function, wherein the machine learning system generates recognition data that is indicative of identity;
- determining first assessment data indicative of performance of the machine learning system trained at the first time;
- based on the first assessment data, generating a third plurality of triplets, wherein at least one triplet of the third plurality comprises synthetic data; and
- training, at a second time and using the first plurality of triplets and the third plurality of triplets, the machine learning system.

14. The method of claim 13, wherein the first loss function comprises a pairwise label-based loss function in which each triplet consists of an anchor sample, a positive sample, and a negative sample.

15. The method of claim 13, wherein each triplet comprises:
- an anchor sample associated with a first identity;
- a positive sample associated with the first identity; and
- a negative sample that is not associated with the first identity.

16. The method of claim 15, wherein the negative sample comprises one of:
- a same pose as one or more of the anchor sample or the positive sample; or
- a first set of coarse features and a second set of fine features, wherein:
- one or more of the anchor sample or the positive sample include the first set of coarse features and a third set of fine features; and
- the negative sample includes a fourth set of fine features.

17. The method of claim 13, wherein:
- the generating the second plurality of triplets uses a generative adversarial network (GAN) at a third time;
- the generating the third plurality of triplets uses the GAN at a fourth time; and
- wherein the third plurality of triplets omits the second plurality of triplets.

18. The method of claim 13, further comprising:
- determining a first category associated with at least a portion of one or more of the first plurality of triplets or the second plurality of triplets;
- wherein the first assessment data is indicative of a determination of recognition data that is associated with the first category being less than a threshold value; and
- wherein the third plurality of triplets is representative of the first category.

19. The method of claim 18, wherein the first category is indicative of one or more of:
- demographic data,
- a physical attribute, or
- an occupation.

20. The method of claim 13, further comprising:
- acquiring a first image of a hand, wherein the hand was illuminated with light having a first polarization;
- acquiring a second image of the hand, wherein the hand was illuminated with light having a second polarization; and
- determining the actual data based on the first image and the second image.

* * * * *

UNITED STATES PATENT AND TRADEMARK OFFICE
CERTIFICATE OF CORRECTION

PATENT NO. : 11,714,877 B1
APPLICATION NO. : 17/038463
DATED : August 1, 2023
INVENTOR(S) : Alon Shoshan et al.

It is certified that error appears in the above-identified patent and that said Letters Patent is hereby corrected as shown below:

In the Claims

Column 20, Claim 1, Line 28:
Currently reads: "that is indicative of determines an identity of a user"
Where it should read: --that is indicative of an identity of a user--.

Column 20, Claim 1, Line 31-32:
Currently reads: "generate a first training request third plurality of triplets"
Where it should read: --generate a third plurality of triplets--.

Column 20, Claim 4, Line 55:
Currently reads: "a positive sample associated with the first identity,"
Where it should read: --a positive sample associated with the first identity, and--.

Signed and Sealed this
Fifth Day of September, 2023

Katherine Kelly Vidal
*Director of the United States Patent and Trademark Office*